Aug. 8, 1961 — P. BILLOTTI — 2,995,055
DUAL METRONOME
Filed Dec. 9, 1957

INVENTOR.
PAUL BILLOTTI
BY
Richards & Geier
ATTORNEYS

United States Patent Office 2,995,055
Patented Aug. 8, 1961

2,995,055
DUAL METRONOME
Paul Billotti, Carnegie Hall, Suite 862, 881 7th Ave.,
New York, N.Y.
Filed Dec. 9, 1957, Ser. No. 701,441
1 Claim. (Cl. 84—470)

This invention relates to a metronome and refers more particularly to a dual metronome.

Practical experience has shown that it was an arduous and intricate task for music students to be able to learn various beat frequencies of a given musical composition without the aid of a suitable device which would produce the desired dual tones corresponoding to a ratio of beats for the left and right hand, respectively, or some fingers in relation to other fingers. Prior art did not provide a construction which could be used readily to enable the student to use such device to a practical and beneficial extent. Numerous expedients have been presented, however, which intended to eliminate some of the drawbacks normally encountered by the prior art, but none of these have proved to be successful enough to yield a thoroughly satisfactory solution of this problem.

It is therefore an object of the present invention to provide a dual metronome which is not subject to the disadvantages of the prior art.

Another object of the present invention is to reduce the amount of time required for the teaching and practicing required for the instruction of beat frequencies.

Still an additional object of the present invention is to provide a greater degree of accuracy in musical instruction by producing an apparatus having any number of fixed beat ratios.

It is a further object to provide a mechanical system of tone-producing means to produce a variety of beat frequencies through a variation and extension of the cam principle.

Other objects will become apparent during the course of the following specification.

In the attainment of the aforesaid objectives, an inventive concept of the present invention may be realized through the provision of a dual metronome which has rotatable tone-producing means secured to one end of a shaft and producing tones in a fixed ratio to the beat for the left and right hand respectively, or some fingers in relation to other fingers, upon contact with a suitable striking member.

A fuller understanding of the present invention may be had by referring to the following description taken in conjunction with the accompanying drawings showing, by way of example, a preferred embodiment of the inventive concept.

Figure 1:
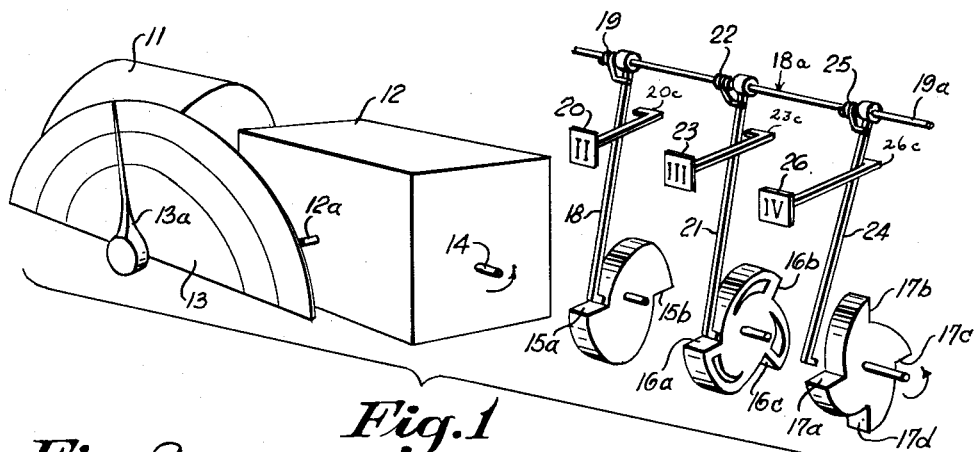
FIGURE 1 is an enlarged perspective view showing the component parts of the dual metronome of the present invention in disengaged fashion.

Referring now to the drawings in greater detail, reference numeral 10 indicates a dual metronome of the present invention, and like reference numerals indicate like parts.

The metronome 10 includes a casing 10a containing an electric motor 11, a variable speed drive 12 and a tone-producing device 18a. The variable speed drive 12 which is of standard constructioin and is not illustrated in detail, is connected with the shaft of the motor 11 and is driven thereby. The variable speed drive 12 has a setting shaft 12a and a driven shaft 14.

The front side of the casing 10 carries a dial plate 13. The shaft 12a extends through the dial plate 13 and is firmly connected at its free end with an indicator 13a which is movable over the dial plate 13.

In the example illustrated three different speeds of playing can be indicated by three different sequences of sound within the same time interval. For that purpose the tone-producing device 18a includes three different cams 15, 16 and 17 which are keyed upon the driven shaft 14. The cam 15 has two crest points 15a, 15b, the cam 16 has three crest points 16a, 16b, 16c and the cam 17 has four crest points 17a, 17b, 17c and 17d.

Three hammer arms 18, 21 and 24 have striking ends adapted to engage and strike the cams 15, 16 and 17, respectively. The opposite ends of the hammer arms 18, 21 and 24 are mounted for swingable movement upon an upper shaft 19a which is carried by the casing 10a. Springs 19, 22 and 25 which are attached to the shaft 19a, have ends pressing against the hammer arms 18, 21 and 24, respectively, so that the striking ends of the hammer arms will be pressed against their respective cams until a crest point of a cam moves beyond the striking end of the hammer arm in contact therewith. At that instant the hammer arm will be actuated by its spring and will strike an underlying surface of its cam, thereby producing a tone.

The cams 15, 16 and 17 may be made of different materials or different weights, so that each cam will produce a different tone when struck. By way of example, the cam 16 is shown in FIGURE 1 as having hollow portions.

The three different speeds of playing which can be indicated by the three cams are represented by three concentrical scales provided upon the dial plate 13.

Figure 2:
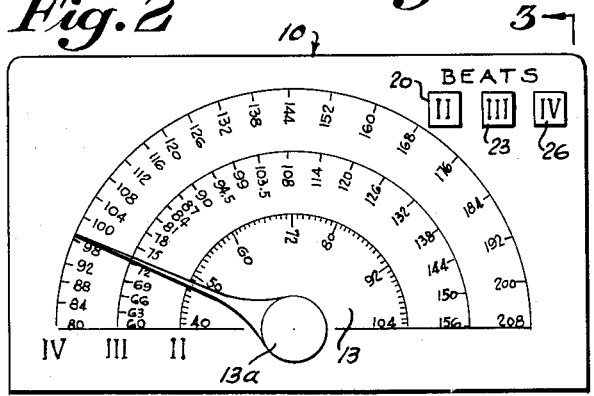
FIGURE 2 is a front elevational view of the casing of the dual metronome containing the component parts and carrying the front dial.
Figure 3:
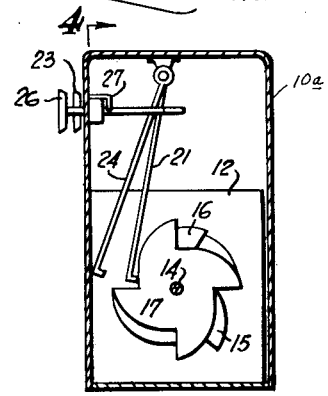
FIGURE 3 is a transverse section taken along the line 3—3 of the dual metronome of FIGURE 2.
Figure 4:
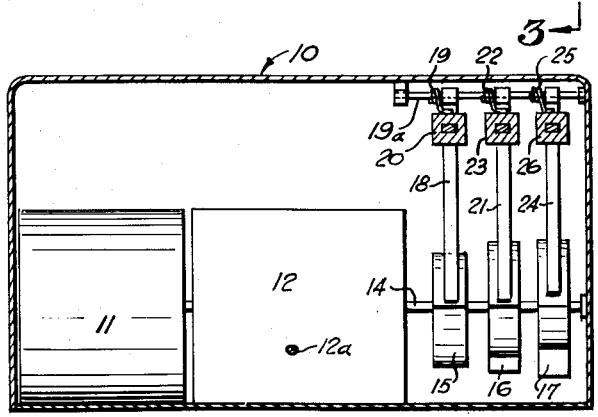
FIGURE 4 is a longitudinal section taken along the line 4—4 of FIGURE 3.

Each of the hammer arms 18, 21 and 24 may be withdrawn from engagement with its cam and maintained in an inoperative position by means of a key 20c, 23c, or 26c, respectively. For that purpose each key has a rear hook-shaped end adapted to engage a hammer arm and to hold it in a withdrawn position. The keys extend through the casing 10a and their front ends carry key plates 20, 23 and 26, respectively. As shown in FIGURE 2, the plates 20, 23, and 26 are located in front of the dial plate 13 so that they may be conveniently operated by the user; they may be provided with the numerals "II," "III" and "IV," respectively, to indicate the number of tones emitted per revolution of the shaft 14.

Figure 5:
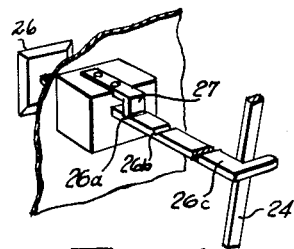
FIGURE 5 is a perspective view of one of the keys, looking from the rear.

Each of the keys 20c, 23c and 26c is provided with two grooves used to hold the key in "in" and "out" positions corresponding to the operative and inoperative positions of the respective hammer arm. As illustrated in FIGURE 5, the key 26c has the two grooves 26a and 26b which may be engaged by a spring 27 attached by a support 27a to an inner surface of the casing 10a. In the "out" position shown in FIGURE 5, the spring 27 engages the groove 26a and the hooked end of the key 26c maintains the hammer arm 24 out of engagement with the cam 17.

The keys 20c and 23c are similarly constructed and actuated.

The operation of the described dual metronome will be apparent from the following specific example:

Let it be assumed that the user desires to produce two separate beat frequencies in the fixed ratio of 2:3 and that the musical composition requires the former beat to occur 48 times per minute and the latter beat to occur 72 times per minute to be played by the left and right hands, respectively.

The user will first set the indicator 13a to the required position shown in FIGURE 2, thereby setting the drive 12 to the required speed. Since the cam 17 must be kept idle, the user will pull the key plate 26 provided with the indicia "IV" to the "out" position shown in FIGURE 5 in which the hammer arm 24 is maintained out of engagement with the cam 17. Finally, the motor 11 is switched "on" by any suitable switch (not shown).

The rotation of the motor 11 is transmitted to the variable speed drive 12 and its shaft 14 which will be rotated along with the cams at the required speed. The hammer arm 18 will strike the cam 15 twice during one complete revolution of the shaft 14. In the example given, the hammer arm 18 will be actuated 48 times per minute.

Similarly, cam 16 will actuate the hammer arm 21 three times or 72 times per minute. When cam 15 rotates past crest 15a, the hammer arm 18 will drop and the spring 19 will cause the hammer 18 to strike cam 15, thus producing an audibly distinct tone.

Similarly, when cam 16 rotates past crest 16a, the hammer arm 21 will drop and the spring 22 will cause the hammer arm 21 to strike cam 16 to produce another audibly different tone.

Thus the student will hear within the same time period two audibly distinct groups, one of two beats and another of three beats which will guide the left and right hand in their respective roles of properly coordinating any two notes against three notes in a given musical composition.

It is apparent, therefore, that by adjusting the mechanical keys of this apparatus, any number of fixed ratios of beats is produced. This same guide is equally useful for students of other musical instruments besides piano, wherein two, three or four beat frequencies are followed at will, while listening to the related contrasting beat frequencies.

It is apparent that the production of different pairs of beat frequencies related to each other in a fixed ratio is a most important feature of the present invention.

The table below shows the relationship between the revolutions per minute imparted by the variable speed drive and the beat frequencies produced by engaging different combinations of the cams.

| Speed of variable speed drive in r.p.m. | Ratio of 2 to 3 in beats per minute | Ratio of 3 to 4 in beats per minute |
|---|---|---|
| | 2 | 3 | 4 |
| 20 | 40 | 60 | 80 |
| 21 | 42 | 63 | 84 |
| 22 | 44 | 66 | 88 |
| 23 | 46 | 69 | 92 |
| 24 | 48 | 72 | 96 |
| 25 | 50 | 75 | 100 |
| 26 | 52 | 78 | 104 |
| 27 | 54 | 81 | 108 |
| 28 | 56 | 84 | 112 |
| 29 | 58 | 87 | 116 |
| 30 | 60 | 90 | 120 |
| 31.5 | 63 | 94.5 | 126 |
| 33 | 66 | 99 | 132 |
| 34.5 | 69 | 103.5 | 136 |
| 36 | 72 | 108 | 144 |
| 38 | 76 | 114 | 152 |
| 40 | 80 | 120 | 160 |
| 42 | 84 | 126 | 168 |
| 44 | 88 | 132 | 176 |
| 46 | 92 | 138 | 184 |
| 48 | 96 | 144 | 192 |
| 50 | 100 | 150 | 200 |
| 52 | 104 | 156 | 208 |

It is to be understood that the invention herein described is not restricted to the illustrated embodiment, but includes of such variation, modifications and equivalents as fall within the scope of the appended claim.

What is claimed is:

A dual metronome for producing simultaneously a plurality of different beat frequencies and tones, said metronome comprising a casing, a motor within said casing, a variable speed drive having a setting shaft and a driven shaft and operatively connected with said motor for setting the speed of said driven shaft, said setting shaft extending through said casing, an indicator located outside of said casing and firmly mounted upon said setting shaft, at least three cams mounted upon said driven shaft and rotatable therewith, each of said cams having a different number of crest points, separate hammer arms cooperating with said cams, springs engaging said hammer arms and pressing them against said cams to cause said hammer arms to strike said cams beyond said crest points for producing said tones, movable keys extending through said casing and having ends engaging said hammer arms for selectively moving a hammer arm from an operative position wherein it engages its cam to an inoperative position, thereby causing the other two hammer arms to strike their cams to produce simultaneously two different beat frequencies and tones, and resilient means engaging said keys for maintaining them in each of said two positions.

References Cited in the file of this patent

UNITED STATES PATENTS

| 991,066 | Jackman | May 2, 1911 |
| 1,964,909 | Garity | July 3, 1934 |

FOREIGN PATENTS

| 234,811 | Switzerland | Feb. 16, 1945 |